July 31, 1962 T. M. HIDER ET AL 3,047,871

ELECTRONIC PRINTER

Filed March 31, 1958 6 Sheets-Sheet 1

INVENTORS.
THEODORE M. HIDER.
JUSTIN J. RENNILSON.
ROGER A. FRECH.

BY Carl R. Brown
agent

INVENTORS.
THEODORE M. HIDER.
JUSTIN J. RENNILSON.
ROGER A. FRECH.
BY Carl R. Brown
agent INVENTORS.
THEODORE M. HIDER.
JUSTIN J. RENNILSON.
ROGER A. FRECH.
BY Carl R. Brown
agent July 31, 1962 T. M. HIDER ET AL 3,047,871

ELECTRONIC PRINTER

Filed March 31, 1958 6 Sheets-Sheet 4

INVENTORS.
THEODORE M. HIDER.
JUSTIN J. RENNILSON.
BY ROGER A. FRECH.
Carl R. Brown
agent

INVENTORS.
THEODORE M. HIDER.
JUSTIN J. RENNILSON.
ROGER A. FRECH.

BY Carl R. Brown
Agent

INVENTORS.
THEODORE M. HIDER.
JUSTIN J. RENNILSON.
ROGER A. FRECH.
BY Carl R. Brown
agent United States Patent Office 3,047,871

Patented July 31, 1962

3,047,871

ELECTRONIC PRINTER

Theodore M. Hider, Justin J. Rennilson, and Roger A. Frech, San Diego, Calif., assignors to General Dynamics Corporation, Rochester, N.Y., a corporation of Delaware Filed Mar. 31, 1958, Ser. No. 725,078
15 Claims. (Cl. 346—110)

The present invention relates to an electronic printer and more particularly, to an electronic printer comprising a complete unit capable of receiving information in the form of electrical energy, transforming said information into character images on the screen of a cathode ray tube and transferring the character images from the screen of the cathode ray tube through a lens arrangement to a recording element from which the character images may be printed on a permanent medium. The invention is capable of transforming electrical information into character images and recording said character images in a permanent record at very high speeds. Since the translation of information is substantially accomplished by electronics, the speed of operation is not ordinarily limited by consideration of movements of mechanical elements.

Advances in high speed electronic computers or like devices has made it desirable to provide a permanent record in character form of the computers' output. This permanent record may be used, as for example, to program further operations of the computer, or, to record the output of the computer. In many instances, the value of a device capable of providing such a permanent record is dependent upon the speed at which the device can read out the information in permanent form and the readability of the recorded information. The main disadvantages of permanent readout systems generally in use are that they operate at a very low speed in comparison with the time required for the computer to compile the data. Also, when their speed is increased any appreciable amount, the quality of the permanent record decreases measurably. Because of their low speeds, the known permanent readout systems require a buffer or storage unit which records the output of computer or the like at the speed the data is processed by the computer. The information thus stored is then fed to the low speed printing unit which provides the permanent record at a speed many times slower than it took the computer to compile the data. This obviously increases the time required for a computer to accomplish a given result and restricts the full use of the computer.

The present invention involves a high speed electronic printing unit which provides a permanent record of the output of a computer or the like at speeds comparable to the speed of operation of the computer. It further provides a high quality record that is easily readable. The invention uses a cathode ray tube capable of displaying character images on the screen of the cathode ray tube at a very rapid rate in response to electronic information supplied by a computer or the like, or in response to any other electronic information capable of causing characters to be displayed on the tube. A lens arrangement transfers the character images from the screen of the tube to a light recording medium. The recording medium, being light sensitive, responds to the light images and through a printing arrangement, transforms the character images formed on the recording medium into a permanent printed record.

In operation, the characters are logically displayed on a tube screen in lines arranged in a column. The time interval for displaying the lines of information is practically instantaneous. In this short interval of time, the lens arrangement, by means of a plurality of light transferring means, transfers all the lines instantaneously displayed to a recording medium in the same condition and arrangement as displayed on the screen, but in a single line form. Thus, character images are sequentially displayed on the screen of the cathode ray tube with the lens arrangement serially transferring the lines to the recording medium with the same logic as displayed on the screen. The ability of the lens arrangement to combine several of the lines simultaneously displayed into a single line image on the recording medium permits a wider printed line upon the final permanent medium than can be displayed on the restricted area of the screen of the cathode ray tube. It is thereby possible for more words per line to be printed on the permanent record than can be displayed across the screen of the cathode ray tube. This also permits an increase in the speed of operation.

The type of cathode ray tube used in the present invention and its affiliated circuitry may be any of the cathode ray tube systems known in the art to be capable of displaying character information on the screen of the tube. However, the system used must be capable of displaying the character information in lines arranged in columnar form and placed on the screen in a position that it may be picked up by the lens. While the raster scan, Lissajous or systems of similar operation may be used, it has been found that a shaped beam cathode ray tube of the type disclosed in Patent Nos. 2,761,988 and 2,736,770 issued to Joseph T. McNaney and assigned to the common assignee hereof, used with circuitry as disclosed in Patent No. 2,736,770 is particularly adaptable for use in the present invention, because the shaped beam cathode ray tube system is capable of displaying lines of high resolution character information in the desired columnar form at speeds commensurate with that of the output of the computer.

The preferred embodiment of this invention is shown and described using xerographic printing apparatus capable of transferring light images onto a print receiving sheet paper or the like. As is well known to persons familiar with this phase of the graphic art, xerography is a term applied to a printing process in which latent electrostatic images of data to be printed are rendered visible by a pigmented electroscopic powder, often termed xerographic toner. The resulting developed toner image is transferred from a light sensitive drum and affixed to a pre-print receiving material. This particular printing arrangement is adaptable to the present invention inasmuch as the recording medium is capable of taking the information from the cathode ray tube at the speed the images are displayed by the cathode ray tube. However, other printers or recorders that operate in a similar manner or accomplish a similar result may also be used.

An object of the present invention is to provide means capable of recording at high speeds electronic code information in the form of logically arranged printed character formations.

Another object is to provide apparatus for reproducing in permanent printed form at high speeds logical character formations displayed on the screen of a cathode ray tube.

A further object of the invention is the provision of means for producing a single line of logically arranged character images on a moving recording medium from characters displayed on the screen of a cathode ray tube when the length of the single line exceeds the width of the tube screen.

Still another object of the invention is to provide means capable of recording character information in single line form on a moving recording medium from character information displayed in lines arranged in columnar form on the screen of a cathode ray tube.

An additional object is to provide an optical means having different length optical paths which is capable of displaying received light images simultaneously on a recording medium.

Another object is the provision of external means for inspecting the condition and alignment of light images projected on a light sensitive medium in a light protective enclosure.

A final object of the invention is the furnishing of an extremely flexible supporting arrangement for a cathode ray tube which is capable of a plurality of adjustments in aligning the character images on the screen of the tube with a lens system.

Other objects and features of the invention will become apparent to those skilled in the art as the disclosure is made in the following detailed description of a preferred embodiment of the invention as illustrated in the accompanying sheets of drawings, in which:

FIGURE 9 is a top plan view of the lens system and the inspection apparatus with the cathode ray tube structure removed.

Figure 1:
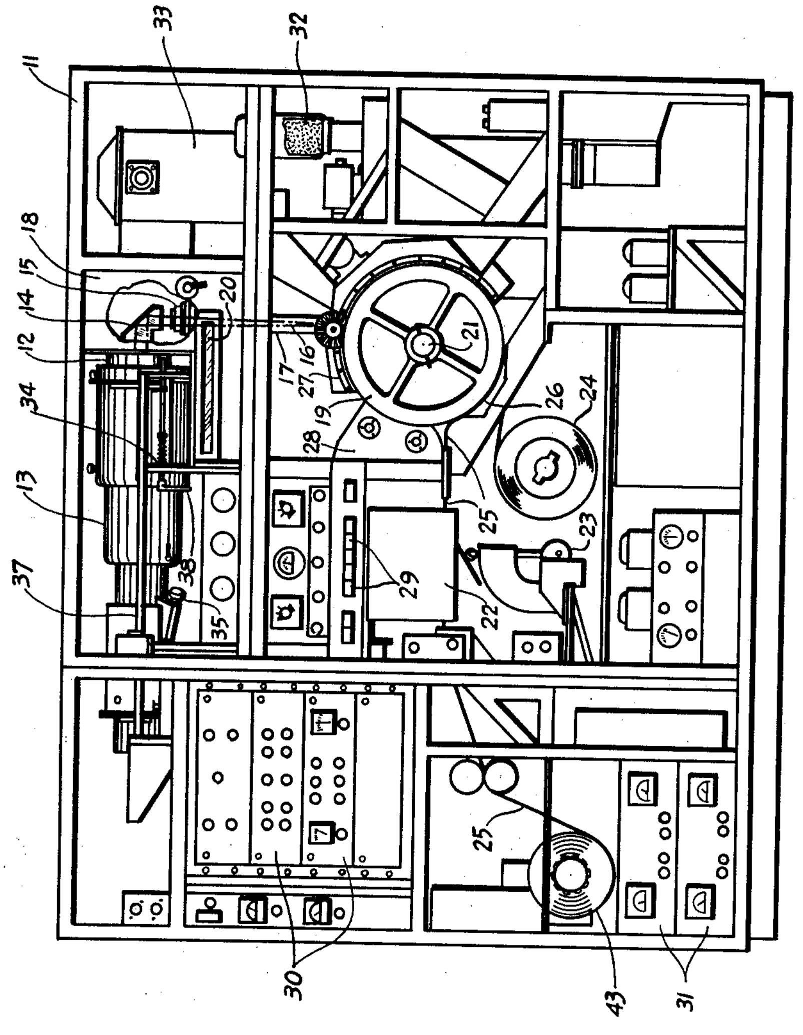
FIGURE 1 illustrates a side elevation of the electronic printer.
Figure 2:
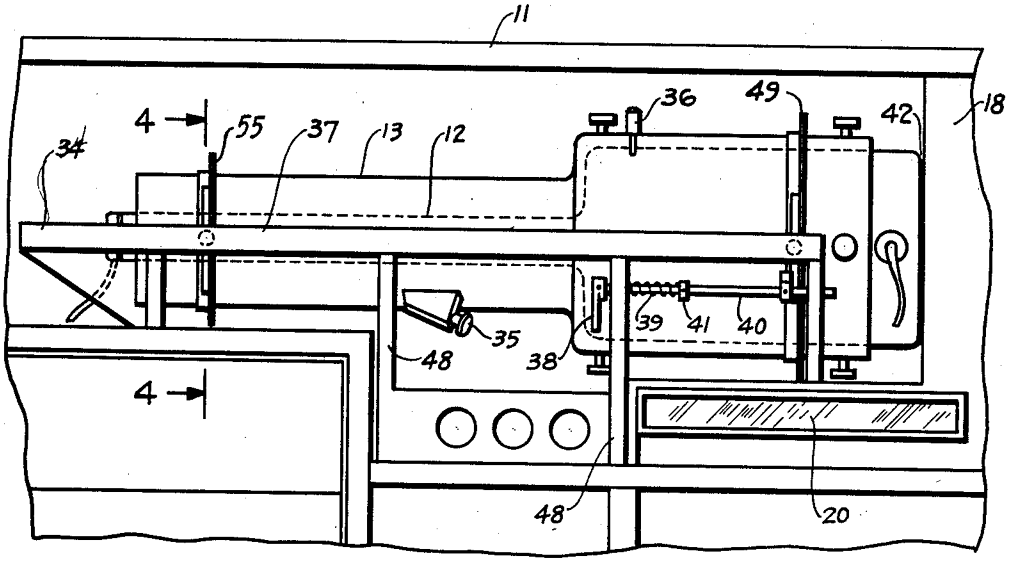
FIGURE 2 is a more detailed illustration of the shield and supporting rack illustrated in FIGURE 1.
Figure 3:
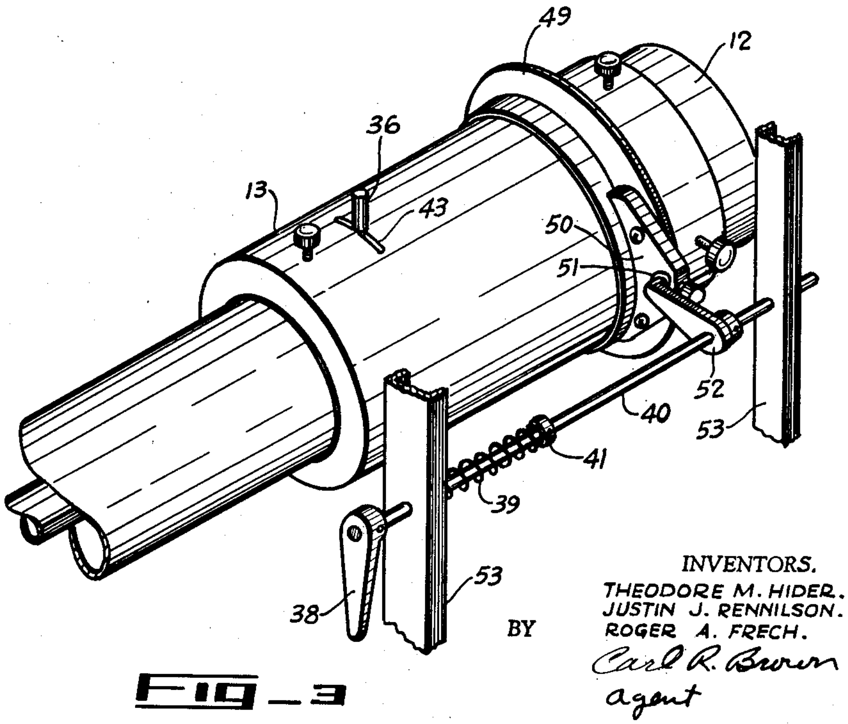
FIGURE 3 is an isometric view of the cathode ray tube and shield and a positioning apparatus.
Figure 4:
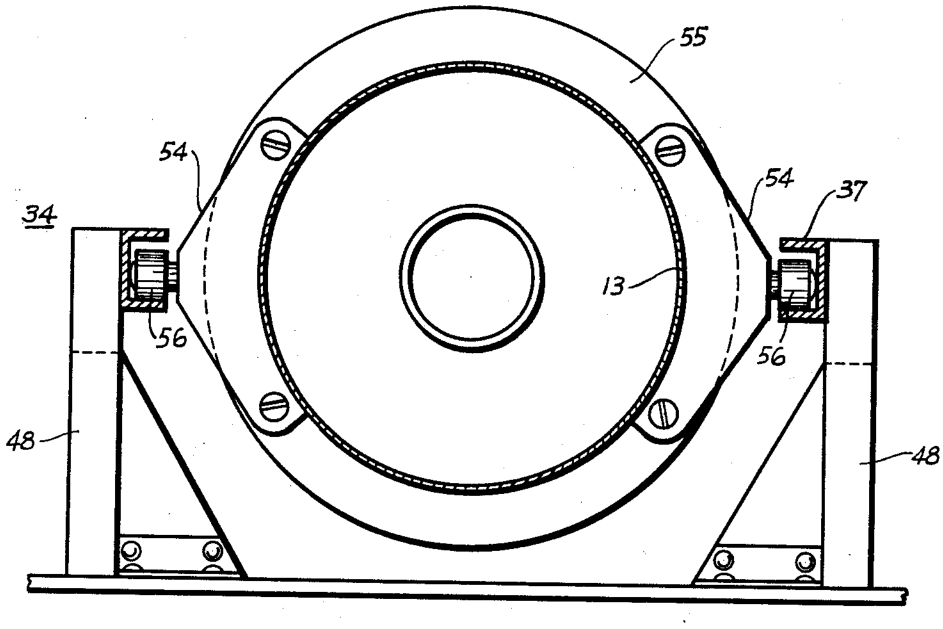
FIGURE 4 shows a section of the tube, shield and supporting rack taken on the line 4—4 of FIGURE 2 looking in the direction of the arrows.

Referring more particularly to the drawings, in which like reference numerals refer to the same parts throughout the several views and to FIGURE 1, a specific embodiment of the invention is shown comprising a unitary cabinet 11 which houses all the components necessary to the operation of the electronic printer. The housing 11 forms a closure for logically positioning the various components in a manner facilitating ease of operation and alignment as will become more apparent later in the description.

In brief the operation of the printer is as follows. The shaped beam cathode ray tube 12 receives electronic information from any electronic data producing device through tube circuits 30 and sequentially displays this information in logically arranged lines of character images on the screen of the tube. As each column of the lines of character images is displayed substantially simultaneously on the screen 57 of the tube (see FIGURE 5), the lines 58 and 59 of the column are simultaneously transferred by the lens system 14 to a light sensitive drum 19 as a single line 60. The light sensitive drum 19 may be a xerographic drum which revolves in a clockwise direction at a constant speed contacting a continuous sheet of paper 25 resulting in a transfer of the images to the paper in a manner to be later described. The continuous sheet of paper 25 passes through the system from roll 24 to roll 43 at a speed synchronized with the rotational speed of the drum 19.

Any cathode ray tube capable of displaying character information on the screen thereof in serial intervals may be used and still be within the purview of the invention. However, the preferred type cathode ray tube and the one that is disclosed in the specific embodiment is a shaped beam cathode ray tube of the type disclosed in Patent Nos. 2,275,017 and 2,283,383 to Joseph T. McNaney and assigned to the common assignee hereof.

The tube control circuits 30 form the logical circuit arrangement necessary to receive the incoming information signals and feed electronic information to the cathode ray tube in a manner facilitating its correct operation. The tube control circuits required will vary depending upon the type of cathode ray tube system used and may be any of those generally known in the art to be suitable for such purposes. However, in the specific embodiment, the tube control circuits required for operation of the shaped beam cathode ray tube may be similar to those circuits disclosed in Patent No. 2,736,770 to Joseph T. McNaney and assigned to the common assignee hereof.

The printing apparatus may be any of the electrostatic types which are capable of utilizing light displayed images on a recording drum or the like. The specific embodiment discloses the use of printing apparatus which utilizes the xerographic method of printing. The xerographic printing process while used herein as an exemplary showing of a recording medium should not be construed to so limit the invention and therefore the same will be described but briefly herein to avoid undue prolixity and unnecessary complexity. For a more detailed description thereof, reference may be had to the U.S. Patent No. 2,221,776 to Carlson and No. 2,573,881 to Walkup et al. The xerographic drum 19 is mounted on a shaft 21 which is suitably supported in frame members for rotation in a clock-wise direction. The shaft may be driven by any suitable movable means such as an electric motor. The xerographic drum 19 includes an electrically conductive cylinder and a printing element or so called electro-photo-plate having a photoconductive insulating layer, which is generally carried by a sheet of flexible metal or other conductive material that enables it to be flexed around and attached to the cylinder. The electrically conductive backing sheet is preferably coated with a light sensitive photoconductive insulating material such as amorphous selenium, for example, which may have a xerographic toner image produced thereon by the steps of electrically charging the layer. In its operation, initially, the photoconductive selenium surface of the rotating drum 19 is electrically charged over its entire width, which is generally the width of the low grade paper 25 which may be used therein. As the drum 19 rotates, the shaped light beam 16 from the cathode ray tube impinges on the drum's selenium surface discharging areas corresponding to the character image shapes. A fine powder developer 32 electrically charged by a friction process in cylinder 33 is then cascaded over the drum. It carries a black thermo-plastic material toner which is the ink of the process. The toner adheres only to the areas of the drum 19 where the light beam from the shaped beam cathode ray tube has discharged the selenium surface, which is the areas of the printed shapes desired. The actual printing is accomplished by placing a sheet of paper in contact with the drum. The toner is then transferred to the paper electrostatically by a transfer grid positioned at 26 and fixed to it by heat exposure and melting in a fuser 22. As the printing is completed the drum surface is cleaned in chamber 28 and recharged by grid 27 and the excess powder recirculated for reuse.

The shaped beam cathode ray tube 12 is substantially enclosed in a metal shield 13. The metal shield adjustably supports the tube and also protects it from external electrical influences which may adversely affect the condition of the character images displayed on the tube screen. (See FIGURES 1 through 4.) The tube is supported within the shield in a manner that permits external control of the tube through the shield and also permits radial movement of the tube within the shield. The manner of securing the tube within the shield and operation of the external controls are defined in detail in an application to John H. Brown, Serial No. 665,900, now Pat. No. 2,889,479, issued June 2, 1959, assigned to the common assignee hereof. As is more clearly disclosed in the aforesaid application, lever 36 is attached to the cathode ray tube and is capable of rotating the tube radially around its longitudinal axis an amount determined by the length of the slot 43 in the shield. This control permits alignment of the radial position of the tube screen relative to the lens system. Knob 35 is remotely connected to the yoke of the cathode ray tube and through its manipulation, the yoke may be adjusted to vary the condition of the beam. Both the aforesaid controls may be exercised while said tube is in its operating position.

Rack 34 is fixedly secured in cabinet 11 for slidably supporting shield 13 and the cathode ray tube 12 in operative position. Channel members 37 in rack 34 are turned inwardly toward the shield for receiving rollers 56. Yokes 50 and 54 are secured respectively to rings 49 and 55 which are secured to shield 13. Thus, the rollers 56 secured to yokes 50 and 54 form a movable supporting means for the tube and shield. The tube and shield may be moved in a direction along the longitudinal axis of the tube and away from a light sealing contact with the lens system permitting the condition and alignment of the characters displayed on the tube screen to be initially adjusted prior to the tube's being moved into operative position. When the tube screen 57 is moved against the light sealing member 42 and in the operative position, it may be resiliently held in this position by manipulating the pin on arm 52 into the recess 51 in yoke 50. This manipulation is accomplished through movement of arm 38 which controls the positioning of arm 52 in the obvious manner. Spring 39 is tensioned by locking collar 41 and resiliently biases the tube face against the light sealing member 42.

Figure 5:
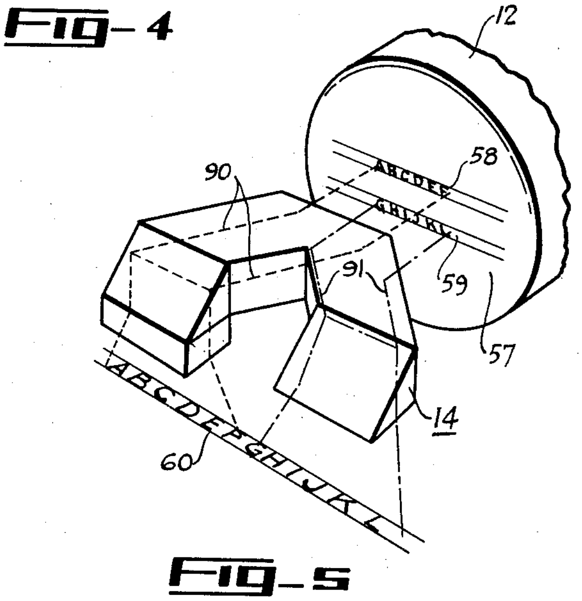
FIGURE 5 is an isometric, diagrammatic view of the manner in which the lines of character images are combined into a single line by the lens system.

The manner of displaying logical character information on the screen 57 of the cathode ray tube is illustrated in FIGURE 5. The coded information pulses are reduced to lines of logical character information by the cathode ray tube and in turn, displayed on the screen of the tube in a plurality of lines arranged in a single vertical columnar form. Lines 58 and 59 are vertically positioned and in this position, are capable of being combined by the split prism lens system 14 and imaged upon the electrostatic plate in single line form 60. The utilizing of more than one line of characters displayed on the tube screen permits a wider line to be displayed on the electrostatic recording medium than is capable of being displayed on the screen 57 of a cathode ray tube 12. It also facilitates an increase in the speed of operation of the printer inasmuch as more electronic information can be reduced to character images, displayed on the tube screen and transferred to the recording medium in a prescribed instant of time than would be the case if a single line display on the tube screen were utilized.

Figure 6:
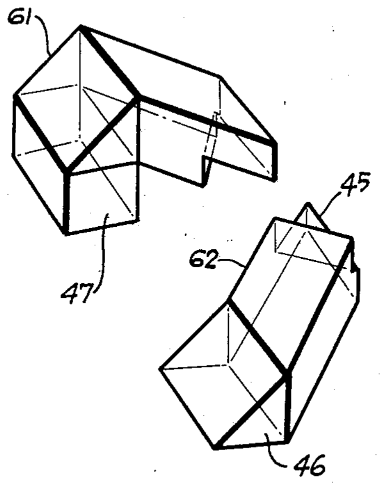
FIGURE 6 is an isometric view of the split prisms when separated.
Figure 7:
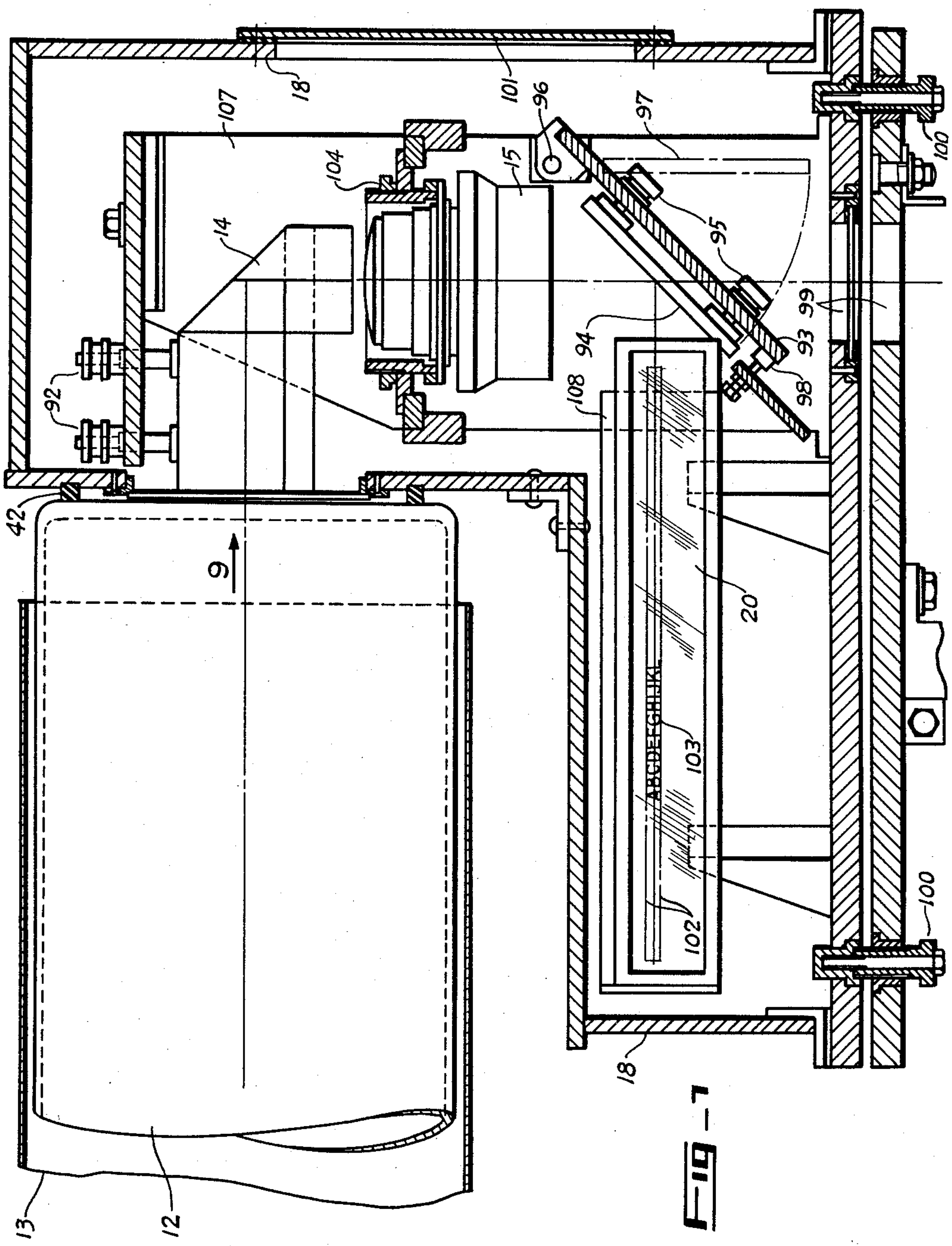
FIGURE 7 is a side elevation partly in section of the lens system and the inspecting apparatus.
Figure 8:
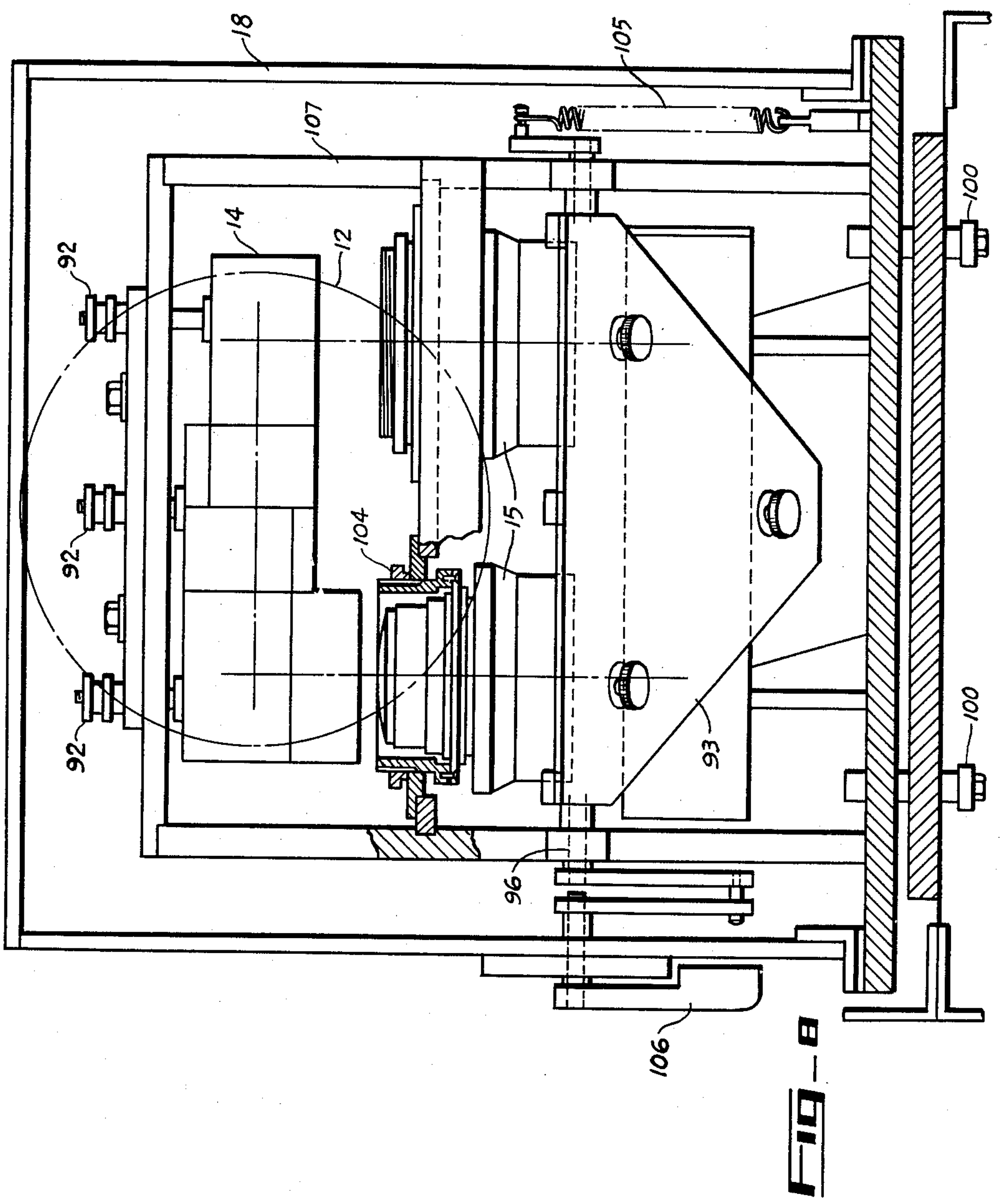
FIGURE 8 is an end view partly in section and looking toward the screen of the cathode ray tube of the lens system and the inspection apparatus.
Figure 6:
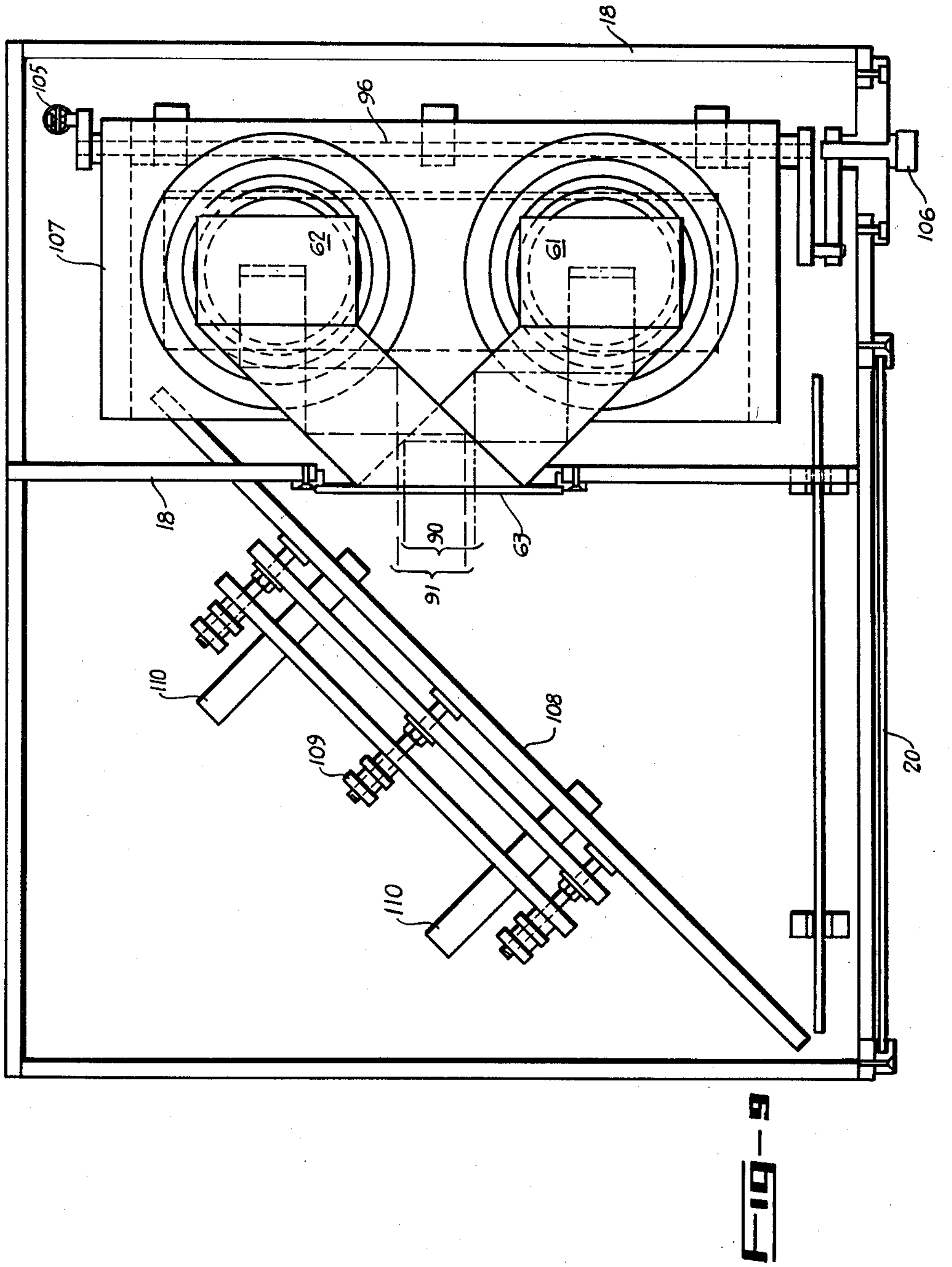

The lens system comprises two separate prisms 61 and 62 as disclosed in FIGURES 5 and 6. Each prism separately receives one of the line of characters on the screen of the cathode ray tube during the instant of its display on the screen and forms a conduit for transferring the light images in their correct order and in substantially the same definiteness of the detail to an objective lens 15 for final imaging on the recording medium. The objective lens 15 is illustrated in FIGURES 7 and 8. The two prisms 61 and 62 are joined together to give a unitary surface facing the screen. This surface, however, is partitioned as shown at 45 in FIGURE 6 with the character lines displayed on the screen being received individually by each separate portion of the composite lens face. The edge 45 that constitutes the junction between the two lens faces is so positioned as to be between lines 58 and 59. The surfaces of each of the prisms are ground and polished, thereby rendering them able to reflect the light images as they pass through the prisms to the objective lens 15 in the manner displayed by lines 90 and 91 in FIGURE 9. At the rear of each prism is a 45°–90° prism 46 which is capable of deflecting the beam downwardly in a direction normal to the longitudinal axis of the cathode ray tube 12. This permits the screen of the tube to be positioned longitudinally in a direction normal to the axis of the beam 16 as it strikes the recording medium. By so arranging the components and using a lens construction as disclosed, a compact arrangement of the components in the cabinet is possible and the alignment of the cathode ray tube with the lens system is made easier.

With reference to FIGURES 5 and 6, the face of prism 61 is vertically spaced a greater distance from either the objective lens 15 or the recording drum 10 than is the face of prism 62. Therefore, the distance that the light images travel from character line 58 to either the object lens 15 or the recording drum is greater than is the case for the light from the line of character images 59. This difference in optical distance traveled between the two lines 58 and 59 can cause the characters in line 60 to be displayed in segments on the recording medium, because the recording medium is moving at a constant speed during the display and any difference in the time of contact of the two lines of images 58 and 59 on the recording medium will result in a displacement between the two lines in the direction of movement of the recording medium. In normal operation, the two lines of characters 58 and 59 are displayed simultaneously on the screen 57 and are simultaneously transferred to the recording medium. Thus, a compensating block 47 is added to the upper-most prism 61 which shortens its optical path to correspond with that of the other prism 62 allowing both lines of characters to reach the recording drum at the same time.

FIGURE 7 shows a broken away view of the inner workings of the optical system and the inspection means which is capable of intercepting the beam and deflecting it to a viewing window. The cathode ray tube 12 is shown in operative position pressed against a light sealing belt 42 embedded into housing 18, thereby providing a light seal around the screen of the cathode ray tube. The housing 18 completely encloses the optical system and precludes the entry of light therein which would interfere with the controlled light transfer to the electrostatic recording medium. An inspection port 101 is provided to facilitate inspecting and making minor corrections and adjustments in the optical system. The split prism lenses 14 are shown in their receiving position secured to stand 107 by adjustable studs 92 capable of adjusting the position of the prisms relative to the tube screen and the objective lenses 15. The objective lenses 15 are also positioned on the positioning stand 107 (see FIGURE 8), and adjustably secured by threaded sleeve 104 for longitudinal movement relative to the prisms 14. The objective lens 15 may be of any lens type capable of receiving and focusing the beam in a desired manner for the distance between the objective lens and the recording medium 19. Separate objective lenses 15 are provided for each of the separate prisms and have optical axes aligned in parallel. Each objective lens is capable of receiving a line from each of the separate prisms 61 and 62 and directing character image beam toward the recording medium in a manner capable of combining the two or more character lines into a single line of characters on the surface of the electrostatic recording medium.

During the operation of the printer it may be necessary from time to time to inspect the condition of the beam or the character images being displayed on the recording drum. However, during the operation of the printer, the optical system is completely enclosed making such an inspection difficult. Therefore, an inspection means is utilized for intercepting the beam and displaying it on a viewing window external from the optical system. This permits an inspection of the condition of the beam during normal operation of the unit and also permits the beam to be aligned relative to the drum. A beam interrupting swinging mirror 93, shown in FIGURES 7 and 8, is capable of being manually operated by lever 106 through the connector arrangement to its rotating axle 96. The mirror is normally biased to position 97 shown in phantom in FIGURE 7 by spring 105 shown in FIGURE 8. When the mirror is in the normal non-intercepting position the beam passes through recesses 99 to the recording medium. To inspect the beam, lever 106 is turned, pushing the swinging mirror 93 into the position shown in FIGURE 7. The radial movement of the mirror is stopped at the correct point by cushioning means 98 which is capable of adjustment to adjust the position of the mirror in its intercepting position. The mirror thus intercepts the beam and reflects it in a direction that will display the beam onto the mirror 108. Mirror 108 in FIGURE 7 then reflects the beam to a translucent optically ground glass 20 in the viewing window. The mirror 108 is provided with adjustment means 109 for adjusting the position of the mirror relative to its supports 110. This adjustment means permits the length of the optical path from the objective lens 15 to the viewing window 20 to correspond exactly with the optical distance from the objective lens 15 to the recording medium 19. Thus, the line of characters displayed on the ground glass in the outside inspection window is identical as to size and arrangement as that imaged on the recording medium. The ground glass 20 has two parallel lines 102 inscribed thereon which are laid out in a manner that they correspond identically with two lines which may be imaged to be positioned across the recording drum in a direction perpendicular to the edge of the drum or perpendicular to the direction of movement of the drum.

Inasmuch as the optical paths to either the recording medium 19 or the ground glass 20 are identical, when the line of character images 103 is so arranged as to be aligned between the parallel lines 102, then the line of character images will also be in correct alignment on the moving recording medium. Further, the quality of the character images can be observed as they are displayed on the ground glass and adjusted accordingly.

The particular embodiment of the invention illustrated and described herein is illustrative only and the invention includes such other modifications and equivalents as may readily appear to those skilled in the art, within the scope of the appended claims.

We claim:

1. In an electronic recorder capable of recording on a permanent medium character information presented on the screen of a cathode ray tube, a cathode ray tube having a light responsive screen for displaying lines of illuminated characters on said screen, said lines being arranged in a column, a light sensitive recording medium, optical means including distinct portions each receiving a separate one of said lines of illuminated characters in its entirety, said optical means transferring said lines so received through separate paths for imaging upon said recording medium in single line form.

2. In an electronic recorder capable of recording on a permanent medium character information presented on the screen of a cathode ray tube, a cathode ray tube having a light responsive screen for displaying lines of illuminated characters on said screen, said lines being arranged in columnar form, a light sensitive recording medium, optical means including distinct portions each receiving a separate one of said lines of illuminated characters in its entirety, said optical means transferring the lines so received through separate paths for imaging upon said recording medium in single line form, and inspection means for viewing the condition of said character information in the form it is recorded on said recording medium without introduction of extraneous light.

3. In an electronic recorder capable of recording on a permanent medium character information presented on the screen of a cathode ray tube, a cathode ray tube having a light responsive screen for simultaneously displaying lines of illuminated characters on said screen, said lines being arranged in a column, a light sensitive recording medium, optical means for simultaneously transferring said illuminated column of character information from said tube screen to said recording medium, said optical means including objective lens means and fixed image combining means, said objective lens means having optical axes directed toward said recording medium, said image combining means including at least two reflecting prisms disposed for receiving said lines of illuminated characters in said columnar form in their entirety and for projecting said lines in a single line beam coincident with said optical axes of said objective lens means, each of said prisms being receptive of only an individual one of said lines of character information received from said screen and being capable of transferring the light image of said line to a distinct portion of said object lens means.

4. In an electronic recorder capable of recording on a permanent medium character information presented on the screen of a cathode ray tube, a cathode ray tube having a light responsive screen for displaying lines of illuminated characters on said screen, said lines being arranged in a column, a light sensitive recording medium, optical means for transferring said illuminated character information from said tube screen to said recording medium, said optical means including objective lens means and fixed image combining means, said objective lens means having optical axes directed toward said recording medium, said image combining means including at least two reflecting prisms disposed for receiving said lines of illuminated characters in said column and for projecting and combining said lines in their entirety in a single line beam coincident with said optical axes of said objective lens means, each of said prisms being receptive of only an individual one of said lines of character information received from said screen and being capable of transferring the light image of said line to a distinct portion of said object lens means, said optical means being completely enclosed precluding the introduction of extraneous light into said optical means, inspection means being capable of intercepting said beam between said objective lens means and said recording medium for inspecting the condition of said character information in the form it is recorded on said recording medium without introduction of extraneous light, said inspection means including mirror means for projecting said beam to an outside viewing window in the same condition of alignment that said beam has when contacting said recording medium.

5. In an electronic recorder capable of recording on a permanent medium character information presented on the screen of a cathode ray tube, a cathode ray tube capable of displaying illuminated lines of character information in vertical columnar form on the screen of said cathode ray tube, a recording medium responsive to light images, optical means for transferring said illuminated lines in the form of a beam from said screen to said light responsive surface of said recording medium, said optical means including objective lens means and divided reflecting prism means, said objective lens means including a plurality of lenses having optical axes aligned in parallel, said divided reflecting prism means having at least two reflecting prisms disposed in alignment with the longitudinal axis of said tube for receiving light from said screen and directing said light toward said objective lens means, each of said prism means being receptive to only an individual one of said lines of character information received from said screen and being capable of transferring the light image of said line to an individual one of said objective lenses, said optical axes of said objective lens means being directed toward said recording surface and being capable of projecting said columns of lines received by each of said lenses into a unitary line on the surface of said recording medium, an enclosing means for completely enclosing said optical means and excluding extraneous light therefrom, inspection means for inspecting the condition of alignment of said beam as projected on said recording medium including an outside viewing window, mirror means for intercepting said beam between said objective lens means and said recording medium when in operative position thereby presenting said beam to said outside viewing window, said viewing window having a translucent window with adjacently displaced parallel lines inscribed thereon, said unitary line being projected by said mirror means onto said translucent member between and along said parallel lines, said parallel lines positioned in correspondence with the desired alignment of said unitary line on said recording medium, thereby aligning said unitary line with said recording medium when said unitary line is aligned with said parallel lines.

6. In an electronic recorder, a projection system for transferring illuminated lines of character information arranged in a vertical column on the screen of a cathode ray tube to a single line display on a light sensitive medium comprising objective lens means having optical axes normal to the longitudinal axis of said tube, prism means disposed in alignment with said longitudinal axis of said tube to receive light from said screen and direct said light coincident with said optical axes of said objective lens means, said prism means including a plurality of juxtaposed prisms being similar in form but opposite in arrangement and having a common surface facing said tube screen, said surface being vertically partitioned to include light receiving surface for each of said respective prisms and being so positioned relative to said screen that light from each line of said illuminated characters falls only on one of said receiving surfaces, each of said prisms providing an individual optical path to said objective lens means, the length of said optical paths varying relative to the respective vertical positioning of said individual surfaces upon said partitioned surface, compensating lens means included in selected of said optical paths being dimensioned to correct for the difference between the effective length of the optical path in which said compensating lens is included and other optical paths from other of said prisms to said objective lens means.

7. An electronic printer capable of converting electronic information into character light images and transforming said light images into a printed record comprising a cabinet, a light sensitive recording medium positioned in said cabinet, a cathode ray tube positioned in said cabinet capable of converting electronic information into character images displayed on the screen of said tube, said character images being displayed in lines and said lines being arranged in columnar form, optical means permanently positioned in said cabinet adjacent said screen of said cathode ray tube for transferring said character images in a direction normal to the longitudinal axis of said tube to said light sensitive recording medium, a metal shield substantially enclosing said cathode ray tube, said cabinet having rack means for supporting said cathode ray tube and said shield in close proximity to said optical means and for adjustably positioning said cathode ray tube longitudinally, control means projecting through said shield for controlling the radial positioning of said cathode ray tube relative to said optical means and for exercising control over the operation of said tube, said rack means and said control means being capable of joint operation to correctly position the screen of said tube in operative position relative to said optical means, said optical means including objective lens means and image combining means, said objective lens means having an optical axis directed toward said recording medium and normal to the longitudinal axis of said tube, said image combining means including at least two reflecting prisms disposed for receiving said lines of illuminated characters in said columnar form and for projecting said lines in a single line beam coincident with said optical axis of said objective lens means, said optical means being completely enclosed precluding the introduction of extraneous light into said optical means, inspection means for inspecting the condition of said character information as it is recorded on said recording medium without introduction of extraneous light, said inspection means being capable of intercepting said beam between said objective lens means and said recording medium and including mirror means for projecting said beam to an outside viewing window in the same condition of alignment that said beam has when contacting said recording medium, said control means facilitating control of the operation and radial positioning of said tube when in the operating position thereby permitting alignment of said beam on said viewing window, said recording medium transforming said recorded character information into a printed record.

8. An electronic recorder capable of converting electronic information into character light images and transforming said light images into a permanent record comprising a light sensitive recording medium, a cathode ray tube capable of converting electronic information into character images displayed on the screen of said tube, said character images being displayed in lines on said tube screen and said lines being arranged in columnar form, optical means positioned adjacent said screen of said cathode ray tube for receiving said lines of character images and projecting said lines in a single beam line to said light sensitive recording medium, rack means for supporting said cathode ray tube in close proximity to said optical means and for adjustably positioning said cathode ray tube longitudinally, a metal shield substantially enclosing said cathode ray tube, control means projecting through said shield for controlling the alignment of said character images and said tube screen relative to said optical means, a light protective housing enclosing said optical means and said tube screen and said recording medium, inspection means including an optical viewing window for inspecting the alignment of said character images on said recording medium and a swinging mirror positioned in a locale adjacent to said projected beam, said mirror being secured at one side by a swivel connection permitting said mirror to be moved radially of said connection and thereby intercept said beam, said swinging mirror when positioned in its intercepting position intercepting said beam and reflecting said beam into a mirror arrangement capable of displaying said character images upon said optical viewing window, said window having parallel lines inscribed thereon which correlate with imaginary parallel lines arranged on said recording medium perpendicular to the edge thereof, the position of said single line of character images displayed on said window relative to said parallel lines referencing the alignment of said single line of characters on said recording medium when said beam is not intercepted by said swinging mirror, said control means being selectively operable to align said line of characters relative to said parallel lines on said window and thereby align said line of characters on said recording medium.

9. An electronic printer capable of converting electronic information into character light images and transforming said light images into a printed record comprising a cabinet, a light sensitive recording medium positioned in said cabinet, a cathode ray tube positioned in said cabinet capable of converting electronic information into character images displayed on the screen of said tube, said character images being displayed in lines across said tube screen and said lines being arranged in vertical columnar form, optical means permanently positioned in said cabinet adjacent said screen of said cathode ray tube for transferring said character images in a direction normal to the longitudinal axis of said tube to said light sensitive recording medium, a metal shield substantially enclosing said cathode ray tube, said cabinet having rack means for supporting said cathode ray tube in close proximity to said optical means and adjustably positioning said cathode ray tube longitudinally, control means projecting through said shield for controlling the radial positioning of said cathode ray tube relative to said optical means and also for exercising control over the operation of said tube, said rack means and said control means being capable of joint operation to correctly position the screen of said tube in operative position relative to said optical means, said optical means including objective lens means and image combining means, said objective lens means having an optical axis directed toward said recording medium and normal to the longitudinal axis of said tube, said image combining means including at least two reflecting prisms disposed for receiving said lines of illuminated characters in said columnar form and for projecting said lines in a single line beam coincident with said optical axis of said objective lens means, said prisms being similar in form, but opposite in arrangement and having a common surface facing said tube screen, said surface being vertically partitioned to include a light receiving surface for each of said respective prisms and being so positioned relative to said screen that light from each line of said illuminated characters falls only on one of said receiving surfaces, each of said prisms providing an individual optical path to said objective lens means, the length of said optical paths varying relative to the respective vertical positioning of said individual surfaces upon said partitioned surface, compensating lens means included in selected of said optical paths being dimensioned to correct for the difference between the effective length of the optical path in which said compensating lens means is included and other optical paths from other of said prisms to said objective lens means, a light protective housing enclosing said optical means and said tube screen and said recording medium, inspection means including an optical viewing window for inspecting the alignment of said character images on said recording medium, said inspection means including a swinging mirror positioned in a locale adjacent to said projected beam, said mirror being secured at one side by a swivel connection permitting said mirror to be moved radially of said connection and thereby intercept said beam, said swinging mirror when positioned in its intercepting position intercepting said beam and reflecting said beam into a mirror arrangement capable of displaying said character images upon said optical viewing window, said window having parallel lines inscribed thereon which correlate with imaginary parallel lines arranged on said recording medium perpendicular to the edge thereof, said position of said single line of character images displaced on said window relative to said parallel lines indicating the alignment of said single line of characters on said recording medium when said beam is not intercepted by said swinging mirror, said control means being selectively operable to align said line of characters relative to said parallel lines on said window and thereby align said line of characters on said recording medium, said recording medium transforming said recorded character images into a printed record.

10. An electronic recorder capable of converting electronic information into character light images and transforming said light images into a printed record comprising a light sensitive recording medium, a cathode ray tube capable of converting electronic information nito character images displayed on the screen of said tube, said character images being displayed in lines and said lines being arranged in columnar form, optical means permanently positioned adjacent said screen of said cathode ray tube receiving said lines of character images and for combining said lines in and aligned in single line form and transferring said single line of character images to said light sensitive recording medium, said optical means being completely enclosed by light shielding means for precluding introduction of extraneous light into said optical means, inspection means having an outside viewing window for inspecting the condition and alignment of said character information as it is recorded on said recording medium without the introduction of extraneous light, said inspection means being capable of intercepting said beam between said optical means and said recording medium and including mirror means for projecting said beam to said outside window in the same condition and alignment of said beam contacting said recording medium, a metal shield substantially enclosing said cathode ray tube and adjustably supporting said tube therein, supporting means for positioning said shield adjacent said optical means, said supporting means having longitudinal channels, said shield having rollers attached thereto positioned in said channels permitting said shield and tube to be moved longitudinally but having radial stability, resilient means for biasing said tube in a longitudinal direction in a manner that said tube face forms a light precluding seal with said optical means, said resilient means being capable of adjustably positioning said shield and the tube radially, control means projecting through said shield for controlling the operation of said tube and for permitting said tube to be radially positioned in said shield when said tube is in light sealing contact with said optical means, said control means being selectively operable to align and condition said line of characters on said recording medium to a degree determinable by said inspection means.

11. An electronic recorder capable of recording on a permanent medium character information presented on the screen of a cathode ray tube, a cathode ray tube having a light responsive screen for displaying lines of illuminated characters on said screen, said lines being arranged on said screen in a column, a light sensitive recording medium, optical means positioned adjacent said screen for transferring said illuminated character information from said tube screen to said recording medium, said optical means including objective lens means and image combining means, said objective lens means having optical axes directed toward said recording medium, said image combining means including at least two reflecting prisms disposed in alignment with said longitudinal axis of said tube for receiving said lines of illuminated characters in said column and for projecting said lines in a single line beam coincident with said optical axes of said objective lens means, said prisms having a common surface facing said tube screen, said surface being partitioned into light receiving surfaces for each of said prisms, a metal shield substantially enclosing and adjustably supporting said cathode ray tube, control means projecting through said shield for controlling the radial positioning of said tube and for exercising control over the operation of said tube, said control means being operable to align said lines of characters on said tube screen with said partitioned light receiving surfaces of said prisms.

12. In an electronic recorder capable of recording on a permanent medium character information presented in lines on the screen of a cathode ray tube, a cathode ray tube having a light responsive screen for simultaneously displaying a plurality of illuminated character lines in a column on said screen, a light sensitive recording medium, fixed optical means having separate portions for simultaneously receiving said column of lines of illuminated characters and for simultaneously receiving separate ones of said lines of illuminated characters in their entirety and for simultaneously transferring said lines to said recording medium in single line form.

13. In an electronic recorder capable of recording on a permanent medium character information presented in lines on the screen of a cathode ray tube, a cathode ray tube having a light responsive screen for simultaneously displaying a plurality of illuminated lines in a column on said screen, each of said lines having a length greater than half the distance across said tube screen, a light sensitive recording medium, fixed optical means having separate portions for simultaneously receiving separate ones of said lines of illuminated characters in their entirety and for simultaneously transferring said lines to said recording medium in a single line form.

14. An electronic recorder capable of recording on a permanent medium data presented on the screen of a cathode ray tube, comprising: means, comprising a cathode ray tube having a light producing screen, for displaying lines of data on said screen, said lines being arranged in columnar form; a light sensitive medium; optical means for transferring said columnar lines of data from said tube screen to said medium, said optical means including at least two reflecting prisms each receiving an individual one of said lines of data in its entirety, said prisms projecting said lines in a single line toward said light sensitive medium, said prisms having a common surface facing said tube screen, said surface being partitioned into light receiving surfaces for each of said prisms.

15. An electronic recorder capable of recording on a permanent medium character information presented on the screen of a cathode ray tube, comprising: a cathode ray tube having a light producing screen for displaying lines of illuminated characters on said screen, said lines being arranged on said screen in columnar form; a light sensitive recording medium; optical means positioned adjacent said screen for transferring said illuminated character information from said tube screen to said recording medium, said optical means including objective lens means and image combining means, said objective lens means having optical axes directed toward said recording medium, said image combining means including at least two reflecting prisms disposed in alignment with said longitudinal axis of said tube each receiving an individual one of said lines of illuminated characters in its entirety, said prisms projecting said lines in a single line beam coincident with said optical axes of said objective lens means, said prisms having a common surface facing said tube screen, said surface being partitioned into light receiving surfaces for each of said prisms; and control means for aligning said lines of characters on said tube screen with said partitioned light receiving surfaces of said prisms.

References Cited in the file of this patent

UNITED STATES PATENTS

| | | |
|---|---|---|
| 1,751,584 | Hansell | Mar. 25, 1930 |
| 1,801,450 | Owens | Apr. 21, 1931 |
| 1,894,264 | Chretien | Jan. 17, 1933 |
| 2,483,147 | Mol | Sept. 27, 1949 |
| 2,537,040 | Doyle et al. | Jan. 9, 1951 |
| 2,725,786 | McCarthy | Dec. 6, 1955 |
| 2,736,770 | McNaney | Feb. 28, 1956 |
| 2,751,275 | Mansberg | June 19, 1956 |
| 2,777,745 | McNaney | Jan. 15, 1957 |
| 2,825,260 | O'Brien | Mar. 4, 1958 |
| 2,829,025 | Clemens et al. | Apr. 1, 1958 |